US012641438B2

(12) United States Patent
Khanka et al.

(10) Patent No.: US 12,641,438 B2
(45) Date of Patent: May 26, 2026

(54) OPTIMIZING ON-DEMAND COVERAGE AT EVENTS

(71) Applicant: T-MOBILE INNOVATIONS LLC, Overland Park, KS (US)

(72) Inventors: Bhagwan Singh Khanka, Las Vegas, NV (US); Brandon James Braunlich, Henderson, NV (US)

(73) Assignee: T-Mobile Innovations LLC, Overland Park, KS (US)

( * ) Notice: Subject to any disclaimer, the term of this patent is extended or adjusted under 35 U.S.C. 154(b) by 327 days.

(21) Appl. No.: 18/400,218

(22) Filed: Dec. 29, 2023

(65) Prior Publication Data

US 2025/0220439 A1     Jul. 3, 2025

(51) Int. Cl.
H04W 16/04 (2009.01)
H04W 16/18 (2009.01)

(52) U.S. Cl.
CPC ........... H04W 16/04 (2013.01); H04W 16/18 (2013.01)

(58) Field of Classification Search
CPC .............................. H04W 16/18; H04W 16/04
See application file for complete search history.

(56) References Cited

U.S. PATENT DOCUMENTS

| | | | | |
|---|---|---|---|---|
| 2019/0349848 A1* | 11/2019 | Bali | .................... | H04L 12/2838 |
| 2021/0314786 A1* | 10/2021 | Liu | ........................ | H04W 16/32 |
| 2023/0064719 A1* | 3/2023 | Wang | .................... | H04W 16/10 |
| 2025/0119760 A1* | 4/2025 | Khalid | .................. | H04W 76/10 |

* cited by examiner

*Primary Examiner* — Muhammad N Edun
(74) *Attorney, Agent, or Firm* — Shook, Hardy & Bacon

(57)     ABSTRACT

Systems and methods are provided for dynamically optimizing on demand coverage at one or more coverage locations. The system includes a plurality of coverage locations, a centralized location comprising a plurality of basebands and at least one controller, a plurality of fiber cables that extend from the centralized location to the coverage locations, and one or more processors. The one or more processors are configured to receive data that identifies the number of users needing coverage at a first coverage location during a first event. Based on determining whether the number of users needing coverage at the first coverage location of the plurality of coverage locations exceeds a predetermined capacity threshold for the first coverage location for the first event is determined, the system assigns at least one additional baseband to provide additional coverage to the first location.

20 Claims, 7 Drawing Sheets

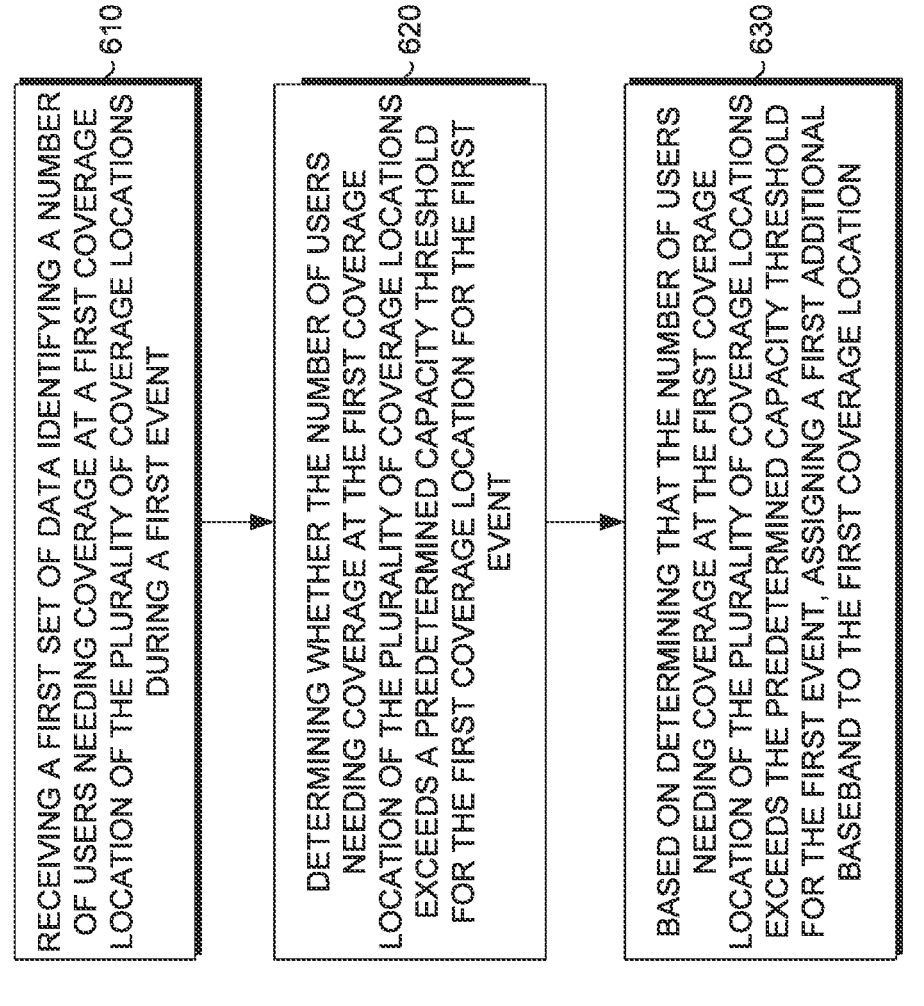

RECEIVING A FIRST SET OF DATA IDENTIFYING A NUMBER OF USERS NEEDING COVERAGE AT A FIRST COVERAGE LOCATION OF THE PLURALITY OF COVERAGE LOCATIONS DURING A FIRST EVENT ⌐610

DETERMINING WHETHER THE NUMBER OF USERS NEEDING COVERAGE AT THE FIRST COVERAGE LOCATION OF THE PLURALITY OF COVERAGE LOCATIONS EXCEEDS A PREDETERMINED CAPACITY THRESHOLD FOR THE FIRST COVERAGE LOCATION FOR THE FIRST EVENT ⌐620

BASED ON DETERMINING THAT THE NUMBER OF USERS NEEDING COVERAGE AT THE FIRST COVERAGE LOCATION OF THE PLURALITY OF COVERAGE LOCATIONS EXCEEDS THE PREDETERMINED CAPACITY THRESHOLD FOR THE FIRST EVENT, ASSIGNING A FIRST ADDITIONAL BASEBAND TO THE FIRST COVERAGE LOCATION ⌐630

OPTIMIZING ON-DEMAND COVERAGE AT EVENTS

TECHNICAL FIELD

The present invention relates to the use of a system for optimizing coverage on demand at one or more event locations, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods for optimizing coverage on demand at one or more event locations based on the changing needs for each event location are disclosed. When large events take place, such as concerts or sporting events, there is a need for high capacity and coverage in order for users to be able to effectively utilize wireless devices within a small geographical area. Without providing for high capacity and coverage, when thousands of users are within a small area, the result is the lack of good throughput and failed connections. For example, at an annual music festival, there may be several thousand concertgoers expected during a finite time period (e.g. a weekend) within a small space (e.g. one mile, a stadium, a large park, etc.) Naturally, concertgoers will want and need to utilize wireless devices such as cell phones, tablets, and the like in order to communicate while at the event. However, the normal infrastructure in place at such locations is generally not adequate to provide coverage for such large groups of people.

Normally, event locations, such where a festival is taking place does not need such high capacity and coverage as the number of users utilizing resources on a daily basis is significantly lower than the number of users present during a specific event. As such, in order to accommodate massive crowds of users that would need coverage on their user devices (UEs), temporary support structures that can provide the additional coverage needed are usually constructed to accommodate specific events. For example, several additional temporary base stations may be erected in the area of a large music festival for a short time period (e.g. a week or weekend) in order to provide the additional coverage capacity needed for the increase in users in the area. Previously, in order to accommodate the significant increase in the number of users and capacity needed, the only option was to construct temporary infrastructure at or near the actual event location. However, such construction is not only costly but is not an effective use of resources as the additional coverage provided by the additional infrastructure may only be needed a few times a year. Installation and removal of the equipment needed to provide adequate coverage requires significant manpower and costs. Therefore, there is a need for an alternative solution to providing high capacity and coverage during events at different locations, without having to install the physical equipment at each location for the duration of each event that will only be used periodically.

The present system addresses this problem by providing systems and methods for optimizing coverage on demand at one or more event locations. To optimize coverage, the system and methods disclosed provide for the deployment of large capacity at a location based on the needs of the location during a specific time period or event. Instead of constructing infrastructure at each event site, resources such as the basebands, will be housed at a central location that allows for the deployment of additional capacity to multiple locations quickly and eliminates the waste of resources when a given event is over and the need for additional capacity ends. The adjustment of capacity is dynamic and can be increased or decreased based on data received for each event location during each event. This is a significant improvement as the coverage needs at each location can be adjusted as needed by directing additional basebands from a central location to the event location as needed. This also greatly reduces costs as only the amplifier and antenna are needed at the event location instead of the whole base station and its components.

BRIEF DESCRIPTION OF THE SEVERAL VIEWS OF THE DRAWINGS

Implementations of the present disclosure are described in detail below with reference to the attached drawing figures, wherein:

FIG. 6 depicts a flow diagram of an exemplary method for optimizing coverage at different locations, in accordance with aspects herein.

DETAILED DESCRIPTION

Figure 1:
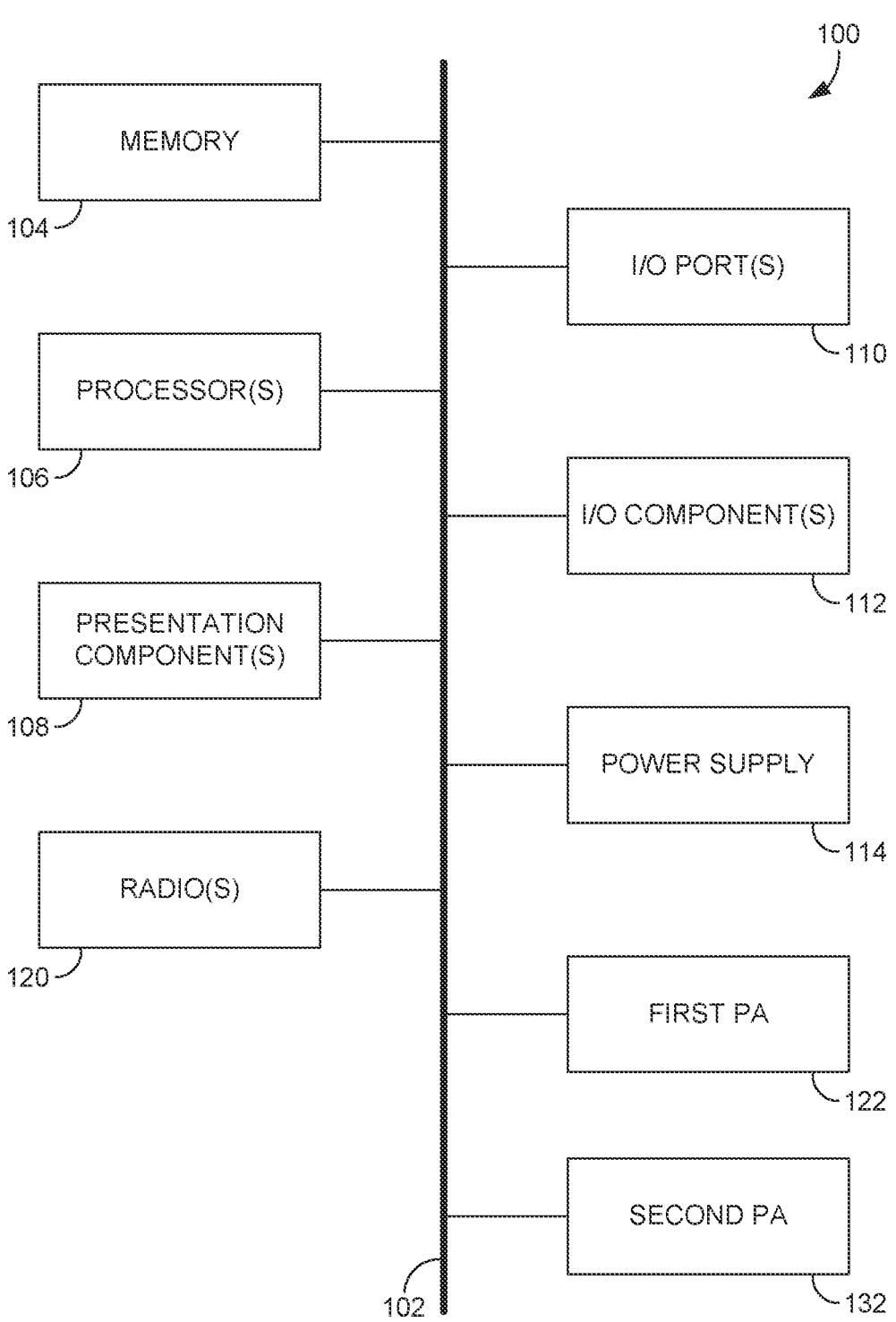
FIG. 1 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE (Long Term Evolution), 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point.

In aspects, a UE provides location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point 0. In other aspects, the processing of said information may be done remotely.

Generally speaking, many modern UEs comprise at least two transmitters; in some configurations, a UEs may operate using dual connectivity. That is, the UE may use at least a first of its transmitters to communicate a first uplink signal to a first node at an access point and at least a second of its transmitters to communicate a second uplink signal to a second node at the access point. In other configurations, a UE may operate using single connectivity, wherein it uses one or more of its transmitters to communicate with a single access point, base station, or cell site at one or more nodes. Whether using dual connectivity or single connectivity, a UE may have a pre-set maximum total uplink power (as will be discussed in greater detail below). Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, UE may not increase the power of the transmission (it may retry again later or attempt to connect to a different access point, for example).

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably for simplicity, and thus the terms should not be construed as limiting with regard to one another unless expressly designated as such in this Detailed Description. Examples of a cell site include macro cells such as a cell tower controlled by a gNodeB, as well as small cells, such as a femto cell or pico cell. Accordingly, the scale and coverage area of an access point is not limited to the examples discussed, and any size and shape of coverage area are contemplated to be within the scope of the invention. Because a cell tower and a base station(s) controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

The terms "radio," "controller," "antenna," and "antenna array" are used interchangeably to refer to one or more software and hardware components that facilitate sending and receiving wireless radio frequency (RF) signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

The term "baseband," "base band unit" or "base station" are used interchangeably herein and refer to a telecommunications network device used to process baseband signals. The baseband unit can act as the centralized hub of a base station, processing the uplink and downlink data traffic.

As used herein, a "coverage location" is any location that coverage is being provided to from a central location described. For example, a coverage location may include, but is not limited to, a stadium, a large park, a defined geographical radius in which an event is taking place, an event location, an indoor or outdoor theater, a concert venue, a sporting venue, a performance hall, a convention center, a hotel, etc. Any location where an event is taking place that may require additional coverage to meet capacity needs of users during a defined time may be a coverage location. The coverage location may include, house, or store various components of the system such as an antenna or amplifier.

A "central location" as used herein is a location where several components of the system disclosed herein are located and/or stored. For example, a central location may be a large warehouse or building in which the components are housed permanently. The central location can house the plurality of basebands, signal converters, and controller. A plurality of fiber cables will extend from the central location to the coverage or event locations as discussed herein. The central location may house or store additional components or resources as applicable.

A "converter" as used herein is any device that is capable of converting signals from one format to another. A converter is an electronic device that receives one type of signal and outputs another type of signal. For example, as described herein, a converter may convert a digital signal to an analog signal.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

The present disclosure is directed to systems and methods for optimizing on-demand coverage at one or more coverage or event locations. In the past, when large events took place (e.g. concerts, festivals, sporting events), additional infrastructure has been routinely employed in order to accommodate the increase in the number of users present within a small geographical area. For example, a carrier may rent additional land space adjacent to or close by the event space in order to construct additional base stations, antennae and other components necessary for providing cellular coverage to users present during the specific event. As one can imagine, the implementation of such additional infrastructure for a limited period of time requires significant manpower and resources, which are quite costly. The cost of such additional infrastructure for specific events is significant—ranging from tens to hundreds of thousands depending on the number of events taking place, the location, the duration of the event, and the number of users expected to be present. For example, during a music festival taking place on a large parcel of land, the cost would be very high as there may be several events taking place over a large space over several days with thousands of concertgoers in attendance. Even with the additional infrastructure in place for large events, the coverage provided was not guaranteed to be the most effective. Additionally, once an event has ended, the additional infrastructure deployed needs to be deconstructed as it would be a waste of resources to leave such infrastructure in place when there are just a few events taking place in a year. The deconstruction and removal of the additional resources deployed for the event is an additional cost and utilizes significant time and manpower.

In an effort to reduce costs and provide more effective solutions to the challenges of providing coverage during large events that do not take place regularly, a system that can optimize on-demand coverage for one or more event location is needed. The present disclosure describes a solution to this challenge by disclosing a system that is capable of dynamically adjusting the coverage capacity at an event location from a central location that remains intact year around. As will be further described, a system in which on-demand coverage for different locations based on the number of users needed coverage is disclosed. The system utilizes a central location comprising a plurality of basebands and a controller that can dynamically direct additional basebands to provide coverage to a specific location to accommodate the number of users present at a location during an event.

A first aspect of the present disclosure is directed to a system for optimizing on-demand coverage to one or more locations. The system comprises a plurality of coverage locations that require additional coverage capabilities during specific events or specified timeframes. The system also includes a centralized location comprising a plurality of basebands and at least one controller. Further, the system comprises a plurality of fiber cables that extend from the centralized location to the plurality of coverage locations. The system further comprises one or more processors that are configured to perform operations comprising receiving a first set of data identifying a number of users needing coverage at a first coverage location of the plurality of coverage locations during a first event. Based on the first set of data received, the system determines whether the number of users needing coverage at the first coverage location of the plurality of coverage locations exceeds a predetermined capacity threshold for the first coverage location for the first event. After determining that the number of users needing coverage at the first coverage location of the plurality of coverage locations exceeds the predetermined capacity threshold for the first event, the system transmits a signal to the controller indicating that additional capacity is needed at the first coverage location for the first event and directing the controller to assign additional basebands to the first coverage location to provide the additional coverage and capacity needed. The additional basebands assigned to the first coverage location may be assigned for a predetermined period of time, such as the length of the event. In some instances, the additional basebands assigned may remain assigned to the first coverage location until the system conducts a follow up status check and determines that the additional coverage is no longer needed.

A second aspect of the present disclosure is directed to a method for optimizing on-demand coverage at one or more event locations. The method comprises receiving a first set of data identifying a number of users needing coverage at a first event location of the plurality of event locations during a first event. Then, whether the number of users needing coverage at the first event location of the plurality of event locations exceeds a predetermined capacity threshold for the first event location for the first event is determined. Based on determining that the number of users needing coverage at the first event location of the plurality of event locations exceeds the predetermined capacity threshold for the first event, a signal is transmitted to the controller indicating that additional capacity is needed at the first coverage location. The signal transmitted further directs the controller to assign at least one additional baseband to the first coverage location to provide adequate coverage and capacity based on the first set of data.

In aspects, the method further includes receiving a second set of data that indicates whether the addition of the at least one baseband to the first coverage location meets the coverage needs for the number of users at the first coverage location. In some instances, if it is determined that the at least one additional baseband is not enough to meet the coverage needs at the first coverage location, additional basebands may be assigned to the coverage location in order to meet the coverage needs at the first location. In aspects, the method may also include periodically receiving additional data sets from the first coverage location providing updates on the current number of users at the coverage location and whether the current coverage provided needs to be adjusted to provide more or less capacity based on whether more or less users are present. As such, adjustments to the number of basebands assigned to a coverage location can dynamically be adjusted throughout an event to provide the most effective coverage while efficiently utilizing available resources.

Another aspect of the present disclosure is directed to another example system for optimizing on-demand coverage at one or more event locations. The system comprises a plurality of event locations, a centralized location comprising a plurality of basebands and at least one controller, a plurality of fiber cables extending from the centralized location to a plurality of event locations, and one or more processors configured to perform operations. The one or more processors determine a schedule of events to take place at a plurality of event locations and assign at least one baseband to each event location for each event scheduled. Additionally, a first set of data identifying a number of users needing coverage at a first event location during a first event is received and analyzed to determine whether the number of users needing coverage at the first event location exceeds a predetermined capacity for the first event location for the first event. A second set of data identifying a number of users needing coverage at a second event location during a second event is received and analyzed to determine whether the number of users needing coverage at the second event location exceeds a predetermined capacity for the second event location for the second event. Upon determining that the number of users needing coverage at the first event location exceeds the predetermined capacity for the first event location and that the number of users needing coverage at the second event location is less than the predetermined capacity for the second event location, at least one baseband from the second location is re-directed to the first event location to meet the first event location's capacity needs.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 112, I/O components 110, radio 116, transmitter 118, and power supply 122. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 110. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built into computing device 100. Illustrative I/O components 112 include a microphone, joystick, game pad, satellite dish, scanner, printer, wireless device, etc.

The radio 120 represents one or more radios that facilitate communication with a wireless telecommunications network. While a single radio 120 is shown in FIG. 1, it is contemplated that there may be more than one radio 120 coupled to the bus 102. In aspects, the radio 120 utilizes a transmitter to communicate with the wireless telecommunications network. It is expressly conceived that a computing device with more than one radio 120 could facilitate communication with the wireless telecommunications network via both the first transmitter and an additional transmitters (e.g. a second transmitter). Illustrative wireless telecommunications technologies include CDMA, GPRS, TDMA, GSM, and the like. The radio 120 may additionally or alternatively facilitate other types of wireless communications including Wi-Fi, WiMAX, LTE, 3G, 4G, LTE, 5G, NR, VOLTE, or other VOIP communications. As can be appreciated, in various embodiments, radio 120 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
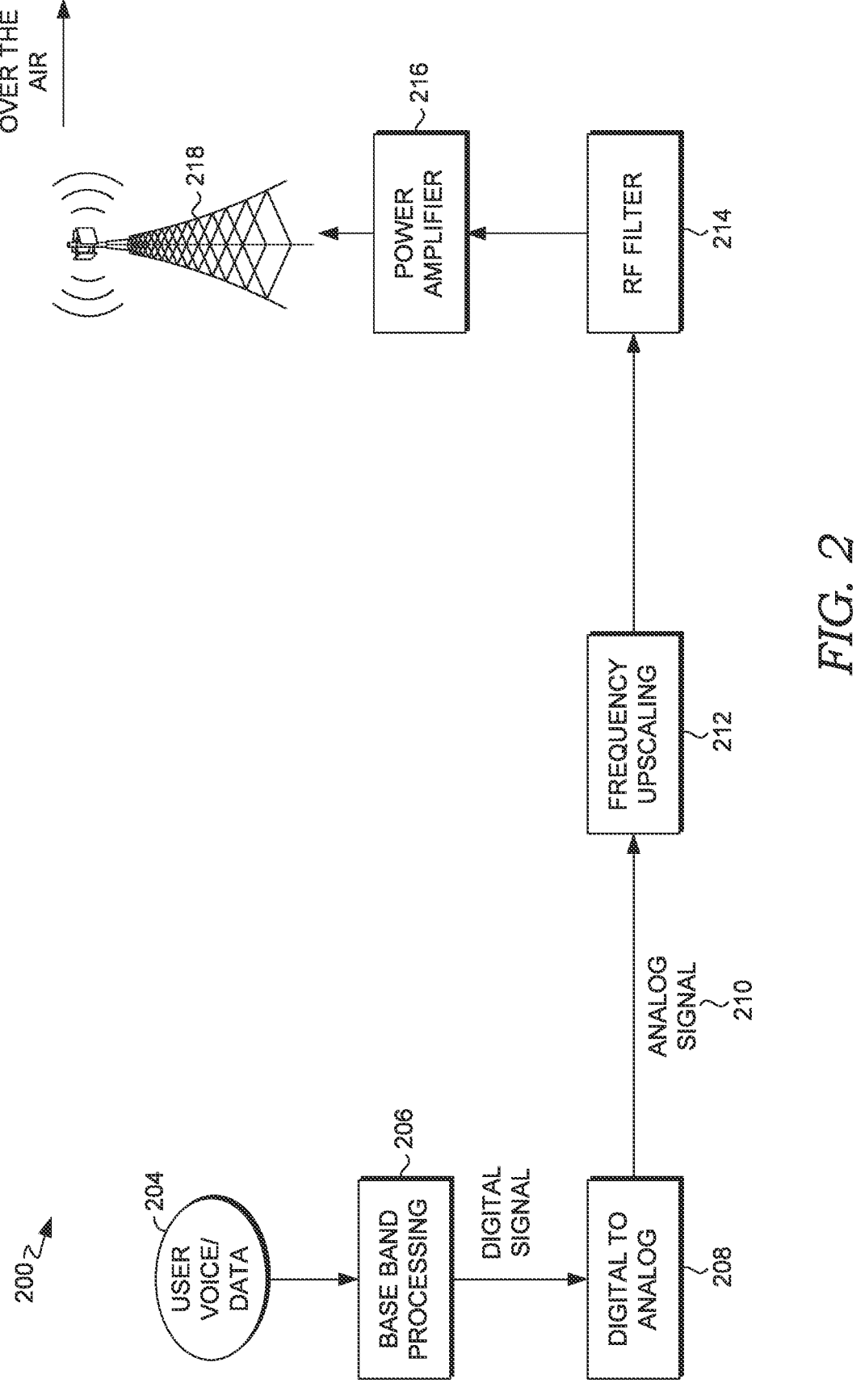
FIG. 2 illustrates an example of a typical site downlink transmission, in accordance with aspects herein.

Next, FIG. 2 provides an exemplary environment 200 illustrating a typical site transmission. In general, when event locations have required additional resources to provide the necessary capacity and coverage for users during a specific event, additional infrastructure has been implemented at or near the event site. A temporary structure has generally been constructed for a specific event with a base station adjacent to or within a close proximity to the event location. For example, a temporary structure may include several beams. Within the event location, several antennae are also traditionally installed.

FIG. 2 illustrates how a downlink transmission occurs according to previous technology. As previously noted, the baseband or access point 218 would be located at or in close proximity to an event location. Then, at or also nearby the event location would be several antenna. To start, user/voice data 204 is transmitted to a baseband. The baseband then conducts baseband processing 206 to process the signals downloaded. The digital signal downloaded is then converted to an analog signal at 208. The analog signal 210 undergoes frequency upscaling 212. Following this, the analog signal 210 is then processed through a radio frequency (RF) filter 214. The power is amplified via a power amplifier 216 as needed and then transmitted over the air via the access point or baseband 218. All of this processing would occur at the temporary infrastructure deployed at the event location for the event.

Figure 3:
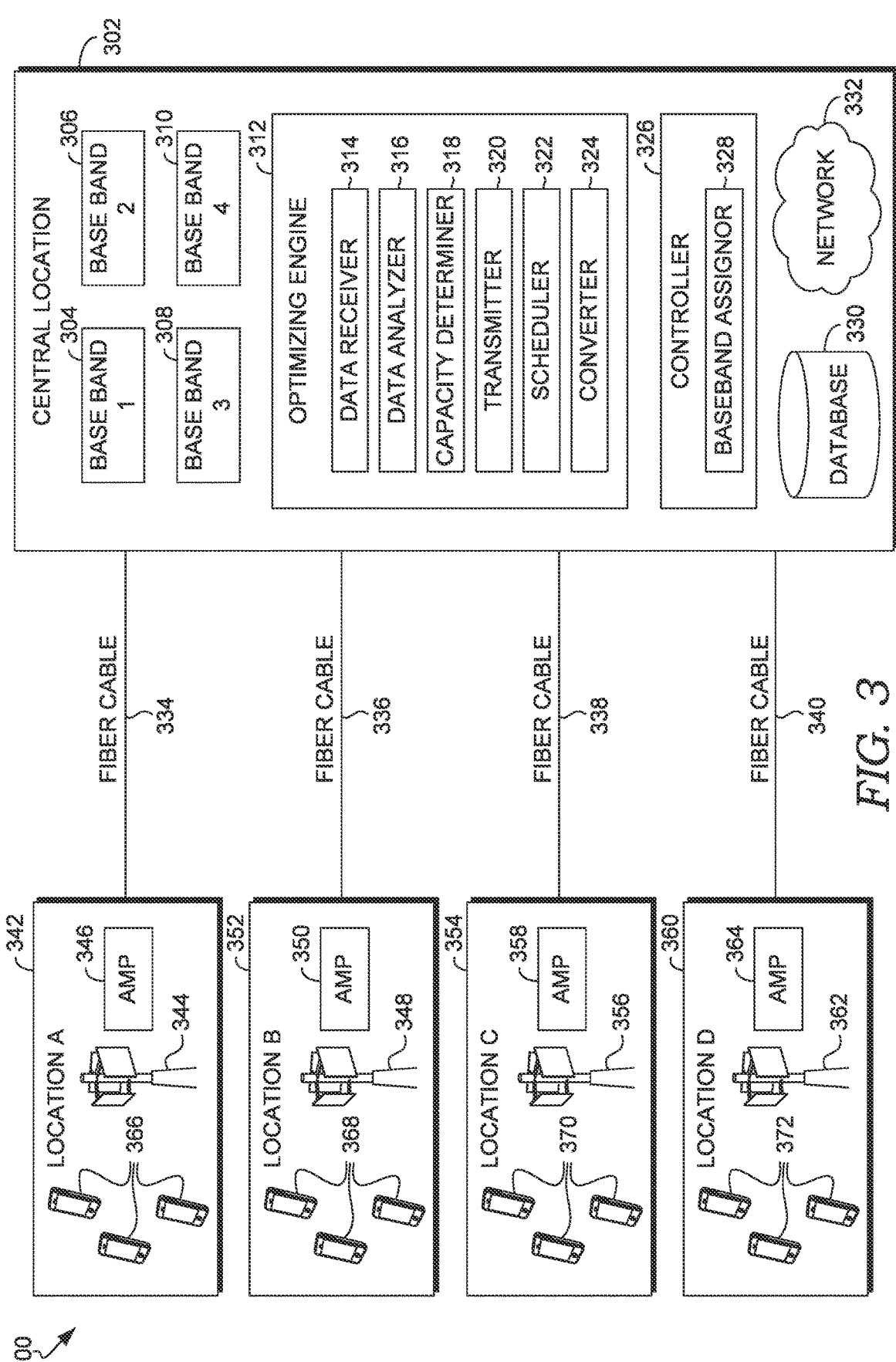
FIG. 3 illustrates diagram of an exemplary network environment in which implementations of the present disclosure may be employed, in accordance with aspects herein.

Next, FIG. 3 illustrates an example system 300 in which embodiments of the present disclosure are implemented. As shown, system 300 includes various components. However, it is noted that system 300 is exemplary only and is not to be interpreted as having any dependency or requirement relating to any one or combination of components illustrated. System 300 generally includes a central location 302, multiple fiber cables 334, 336, 338, and 340 extending from the central location 302 to each coverage location (Location A—342, Location B—352, Location C—354, and Location D—360). At each coverage location 342, 352, 354, and 360, multiple UEs 366, 368, 370 and 372 are depicted. While FIG. 3 depicts a set of three UEs at each coverage location 342, 352, 354, and 360, it is contemplated that the number of user devices present at each coverage location 342, 352, 354, and 360 can range from one to several or hundreds of thousands of UEs depending on the event. The number of UEs represented is purely for exemplary purposes and it is contemplated that there may be no limit on the number of UEs present at each coverage location as different events may attract different crowds of users.

Additionally, at each coverage location 342, 352, 354, and 360 an antenna or access point 344 and amplifier 346 are also present. As shown, coverage location 342 comprises antenna 344 and amplifier 345. Coverage location 352 similarly has antenna 348 and amplifier 350 present. Coverage location C 354 has antennae 3566 and amplifier 358 and coverage location D 360 has antennae 362 and amplifier 364. Once again, while a single antenna and amplifier are shown at each of the coverage locations 342, 352, 354, and 360, in aspects there may be multiple antennas and amplifiers at each location. The number of amplifiers and antennas located at each coverage location 342, 352, 354, and 360 may be dependent on the size of each location and its capacity for event attendees.

The central location 302 houses several components of system 300. As mentioned, one of the advantages of the systems disclosed is optimizing the on-demand coverage for users at event locations occurs by locating the basebands (or base stations) centrally located at central location 302 rather than being scattered at each coverage location. Previously, each coverage location would have a base station or basebands located in close proximity to the coverage location (e.g. adjacent a sports stadium) and there would be several antennas within each coverage location (e.g. within the stadium) to provide the necessary coverage for the users present within the stadium during an event. For example, at Location A, there may one or more base stations/basebands deployed at or near Location A. As previously mentioned, the construction of such infrastructure for large events that take place periodically is not only costly, but did not necessarily guarantee effective coverage and also was not an effective use of resources as each of the components would have to be constructed for a specific event. Such construction may include the cost of renting land to install the base stations, antenna and other components.

Additionally, after the event, the infrastructure would need to be deconstructed and transported to another site or some sort of storage location. If the infrastructure was left in place, then it would only be used periodically, which would also be a waste of resources. Another downside was that there were limitations on how coverage and capacity could be adjusted on-demand. For example, if Location B previously had two base stations deployed near Location B, but the even taking place attracted significantly more users than anticipated, then the coverage provided by the two base stations may not have been adequate. Location B was limited to the resources deployed to Location B and could not add additional resources to increase the coverage and capacity based on the additional users that were present. This would lead to poor connectivity for user devices, low throughput, and unsatisfactory user experiences. Additionally, in some instances, this could even cause delays or problems with communications over user devices that are critical such as communications to emergency services during an event.

As shown, there are four basebands (Baseband 1—304, baseband 2—306, baseband 3—308 and baseband 4—310) located at central location 302. However, it is contemplated that there may be more of fewer basebands present. In this example, there are four basebands 304, 306, 308, and 310 for four coverage locations 342, 352, 354, and 360. In other aspects, the number of coverage locations and basebands may not be 1:1. As described herein, the basebands are located at the central location 302 in order to provide the ability to dynamically adjust the capacity and coverage needed at a coverage or event location based on data received regarding the number of users present. The basebands are programmed so that their parameters can be changed as needed and in real-time.

The central location 302 further comprises an optimizing engine 312 which includes a data receiver 314, data analyzer 316, capacity determiner 318, transmitter 320, scheduler 322, and converter 324. The data receiver 314 is configured to receive sets of data from the coverage locations 342, 352, 354, and 360 regarding the number of users present at each coverage location and the capacity and coverage needed to provide effective connections to the users during the specified event.

In instances, the data receiver 314 receives a first set of data that identifies the number of users needing coverage at a first coverage location of the plurality of coverage locations during a first event. For example, data receiver 314 may receive a first set of data indicating the number of UEs 366 present at Location A 342 during a first event. The data analyzer 316 can then analyze the first set of data and the capacity determiner 318 can determine whether the number of users needing coverage at the first coverage location exceeds a predetermined capacity threshold for the first coverage location for the first event. In other words, the capacity determiner 318 can utilize the analysis by the data analyzer 316 to determine whether the number of users present at Location A 342 is greater than the maximum number of users that Location A can currently provide adequate coverage to. Then, based on determining that the number of users needing coverage exceeds the threshold capacity, the transmitter 320 transmits a signal to the controller to indicating that additional capacity is needed at the first coverage location for the first event. Additionally, the transmitter 320 can also direct the controller to assign additional basebands to Location A 342 in order to meet the coverage needs for the number of users present during the first event.

This ability to dynamically redirect resources from a central location provides a more effective, efficient way to provide additional coverage to locations on as-needed basis. For example, if Location A 342 was configured to be able to support 10,000 users during a first event, but the first set of data indicates that there are 20,000 users present instead, the coverage provided will not be adequate. Without either added infrastructure locally or a way to direct additional resources to Location A 342, there will be problems providing service at Location A 342 that will result in the inability to transmit messages such as SMS (short message service) texts, phone calls, or other wireless communications.

Previously, when infrastructure was deployed for specific events, the amount of additional coverage provided was based on estimates on the number of users that may be present. However, if the predictions were inaccurate regarding the number of users that would be present at the event, the system would not be able to adjust to provide additional resources in real-time. Therefore, if 20,000 users showed up to a concert where only 10,000 were expected, there would be no ability to improve the coverage on-demand and those in attendance would have to manage with whatever level of coverage was available. This would likely lead to several failed wireless connections, ineffective use of resources, and frustrated users. By contrast, the system described herein, allows for a dynamic adjustment on-demand to meet the needs of the event location. Therefore, when the data receiver 314 receives data that there are significantly more users present than anticipated and the number of users exceeds the threshold capacity, the transmitter 320 will notify the controller 326 to make the necessary adjustments.

Controller 326 is shown has comprising baseband assignor 328. While controller 326 is shown to be housed within the central location 302, it is contemplated that the controller 326 may be located separately from the central location 302. Further, baseband assignor 328 is illustrated as being present within the controller, but may also be located elsewhere within the central location 302. Any and all variation of the locations of the components within the central location 302 are possible and the present depicts are merely exemplary.

Upon receiving the message from the transmitter 320 that additional resources are needed at Location A 342, the baseband assignor 328 can assign additional basebands to provide coverage to Location A during the event. Continuing with the current example, the baseband assignor 328 can assign at least one more baseband or multiple additional basebands to Location A in order to provide adequate coverage. If baseband 1—304 was previously the only baseband assigned to Location A 342 for the first event, then the baseband assignor 328 can assign additional basebands that are either unassigned or not currently in use. For example, baseband assignor 328 could assign baseband 2—306 to Location A in addition to the already assigned baseband 1—304. If the baseband assignor 328 determiners that two additional basebands are needed, then both baseband 2 and baseband 3 308 may be assigned to Location A 342 for the first event. Essentially, the baseband assignor 328 will re-direct the necessary number of basebands to provide the amount of coverage needed for the 20,000 users instead of the originally predicted 10,000 users. The baseband assignor 328 will determine which basebands are available to assign by taking into consideration any other scheduled events at different coverage locations and the capacity needs of those events. Additionally, when the event is over, the system is capable of re-directing the additional baseband coverage back to their original locations.

In some instances, the optimizing engine 312 may also comprise a scheduler 322 that is configured to determine a schedule of events that are taking place at a plurality of coverage locations such as locations A 342, Location B 352, Location C 354, and location D 360. Based on the scheduled determined, the baseband assignor 328 can make the initial baseband assignments to each coverage location. For example, if the scheduler 322 determines that the event taking place at location A 342 is anticipated to have 10,000 users present and the event taking place at Location C 354 at the same time or within a close time period (e.g. same day) is anticipated to have 50,000 attendees, the baseband assignor 328 can initially direct more available basebands to Location C 354 and fewer basebands to location A 342 since location A 342 will not need to have as much capacity as Location C 354. Then, at the beginning of the event, during, and after the event, the data receiver 314 can receive data sets indicating the real time number of users at each location. Once again, if the initial baseband assignments are not adequate to provide coverage and the number of users is greater than the threshold capacity for the coverage location, then the transmitter 320 will signal the controller 326 to have the baseband assignor 328 redirect resources to provide the best coverage in each of the even locations for the duration of each event.

The optimizing engine 312 may also comprise a converter 324 that is configured to convert the different signal types. For example, the converter 324 can convert a digital signal to an analog signal and adjust the analog signal as needed. While not shown, it contemplated that each coverage location may also include a second converter that can convert the analog signal to an RF signal.

As shown, the central location 302 also comprises a database 330 and network 332. The sets of data received by the data receiver 314 and records of the assignments of the basebands by the baseband assignor 328 may be stored in the database for future use. Such data may be useful when predicting the amount of coverage needed at different coverage locations based on the anticipated number of users to be present. Additionally, any other relevant data received or generated by the system 300 may also be stored in the database for future use. It is further contemplated that in aspects, artificial intelligence may be used in conjunction with system 300 to more accurately predict and adjust the amount of coverage needed for coverage locations for different events.

In system 300, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point in order to interact with a public or private network.

In some aspects, the UEs can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, for example, a UE comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs, such as UE cluster 366, can optionally utilize network 332 to communicate with other computing devices (e.g., a mobile device(s), a server(s), a personal computer(s), etc.). The network 332 may be a telecommunications network(s), or a portion thereof. A telecommunications network might include an array of devices or components (e.g., one or more base stations), some of which are not shown. Those devices or components may form network environments similar to what is shown in FIG. 3, and may also perform methods in accordance with the present disclosure. Components such as terminals, links, and nodes (as well as other components) can provide connectivity in various implementations. Network 332 can include multiple networks, as well as being a network of networks, but is shown in more simple form so as to not obscure other aspects of the present disclosure.

Network 332 can be part of a telecommunication network that connects subscribers to their immediate service provider. In some instances, network 332 can be associated with a telecommunications provider that provides services (e.g., LTE) to user devices. For example, network 332 may provide voice, SMS, and/or data services to user devices or corresponding users that are registered or subscribed to utilize the services provided by a telecommunications provider. Network 332 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access points (such as antennas 344, 348, 356, and 362) are is configured to communicate with the UEs present at each of the coverage locations, that is located within the geographical area, or cell. For example, antenna 356 is configured to communicate with the UEs 370 present at location C 354. In other implementations, more or less components than those shown in FIG. 3 may be utilized to carry out aspects of the invention described herein.

Figure 4:
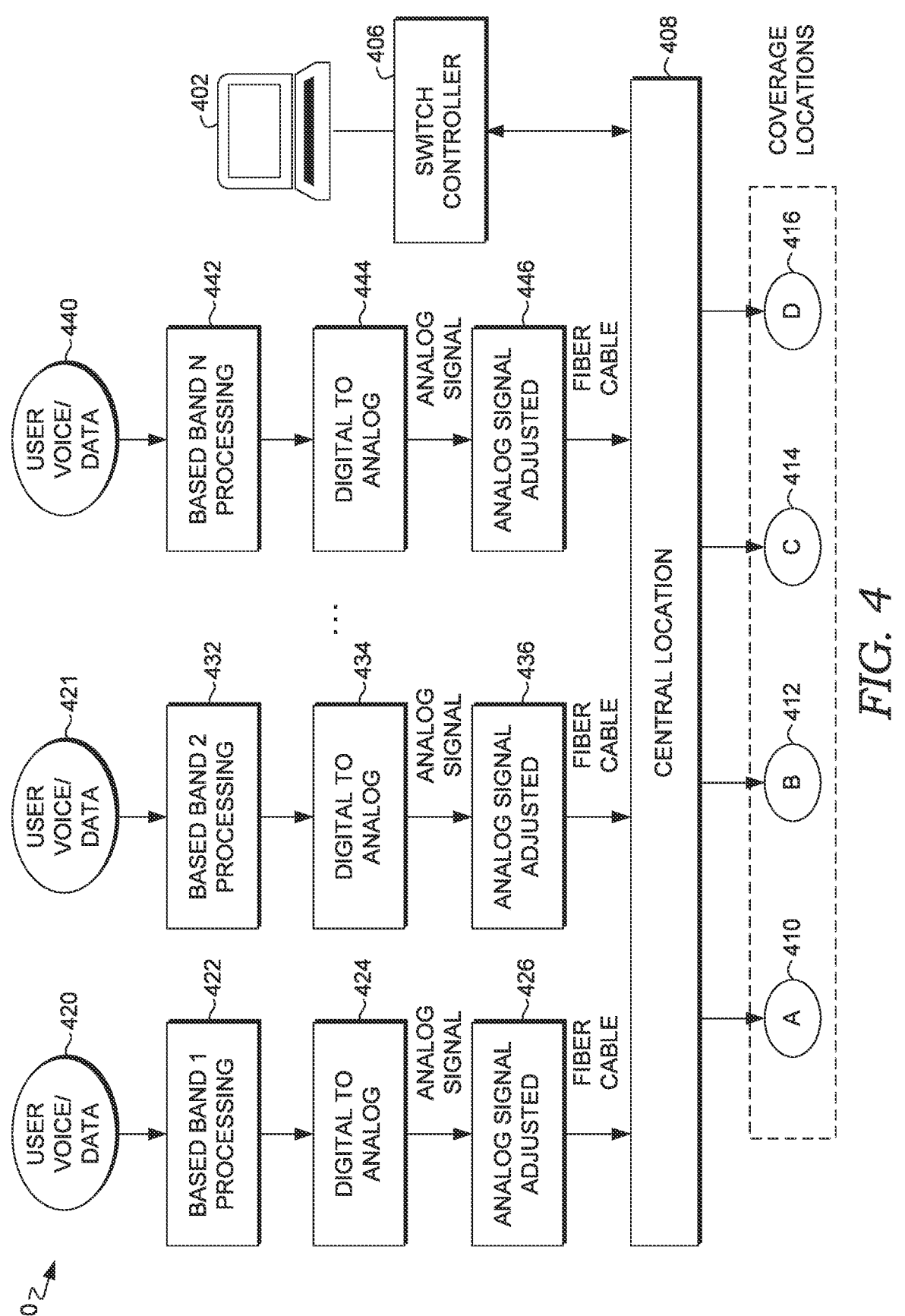
FIG. 4 illustrates an exemplary environment in which the implementations of the present disclosure are implemented to optimize coverage at different locations, in accordance with aspects herein.

Turning to FIG. 4, an exemplary environment in which the implementations of the present disclosure are implemented to optimize coverage at different locations is depicted. The communication process 400 illustrates how the improved system described herein works and how signal transmission and communication occurs from the central location to the coverage locations. As shown, the communication to coverage location A 410, coverage location B 412, coverage location C 414, and coverage location D 416 occurs via fiber cables that extend from the centralized location 408 to each coverage location 410, 412, 414, and 416. At the centralized location, the majority of processing is completed. User/voice data such as user/voice data 420, 421, and 440 are received by the data receiver 314 of FIG. 3 and processed. Such data includes the number of users that are present at the different coverage locations 410, 412, 414, and 416.

Additionally, upon receiving the data sets, the data analyzer 316 of FIG. 3 processes the data, including analyzing and processing the data for each baseband. For example, user voice/data 420 is received by receiver 314 and then processed by analyzer 316 for baseband 1. While at the central location 408, the data 420 is then converted by converter 324 from digital signals to analog signals at 424. Digital signals are converted to analog as they are unable to be transmitted over long distances. Therefore, if the digital signal was not converted to analog as shown at 424, the digital signal would not be able to be transmitted over the fiber cables from the central location 408 to the coverage location A 410. The analog signal is adjusted as needed at 426. Such adjustment may be done by the optimizing engine 312 of FIG. 3. Analog signals are easier to be adjusted and switched by the controller 406 when re-directing resources to coverage locations to provide additional coverage based on the number of users at an event.

Similarly the user voice/data 421 is processed by data analyzer 316 after being received by data receiver 314 for baseband 2 at 432. Once again the data is converted from digital to analog at 434 and then the signal is adjusted as needed at 436 prior to leaving the central location 408 for the respective coverage locations assigned. User voice/data 440 is processed by data analyzer 316 for baseband N and then the digital signal is converted to analog at 444 by the converter 324. The analog signal is adjusted as appropriate at 446 prior to leaving the central location 408 for the assigned coverage location.

In FIG. 4, the switch controller ("controller") 406 is depicted as being separate from the central location 408. However, it is contemplated that the controller 406 can be located within the central location or separately from the central location 408. The controller 406 communicates with a computing device, such as device 402 and also communicates to the centralized location 408 to assign the appropriate coverage based on the needs of each location. Managing the various basebands via the controller 406 is also advantageous as the controller 406 can add different bands as needed (e.g. n41, mm waves, etc.). The controller 406, via the baseband assignor 328 of FIG. 3, can assign or re-direct more or fewer basebands based on need throughout an event.

Figure 5:
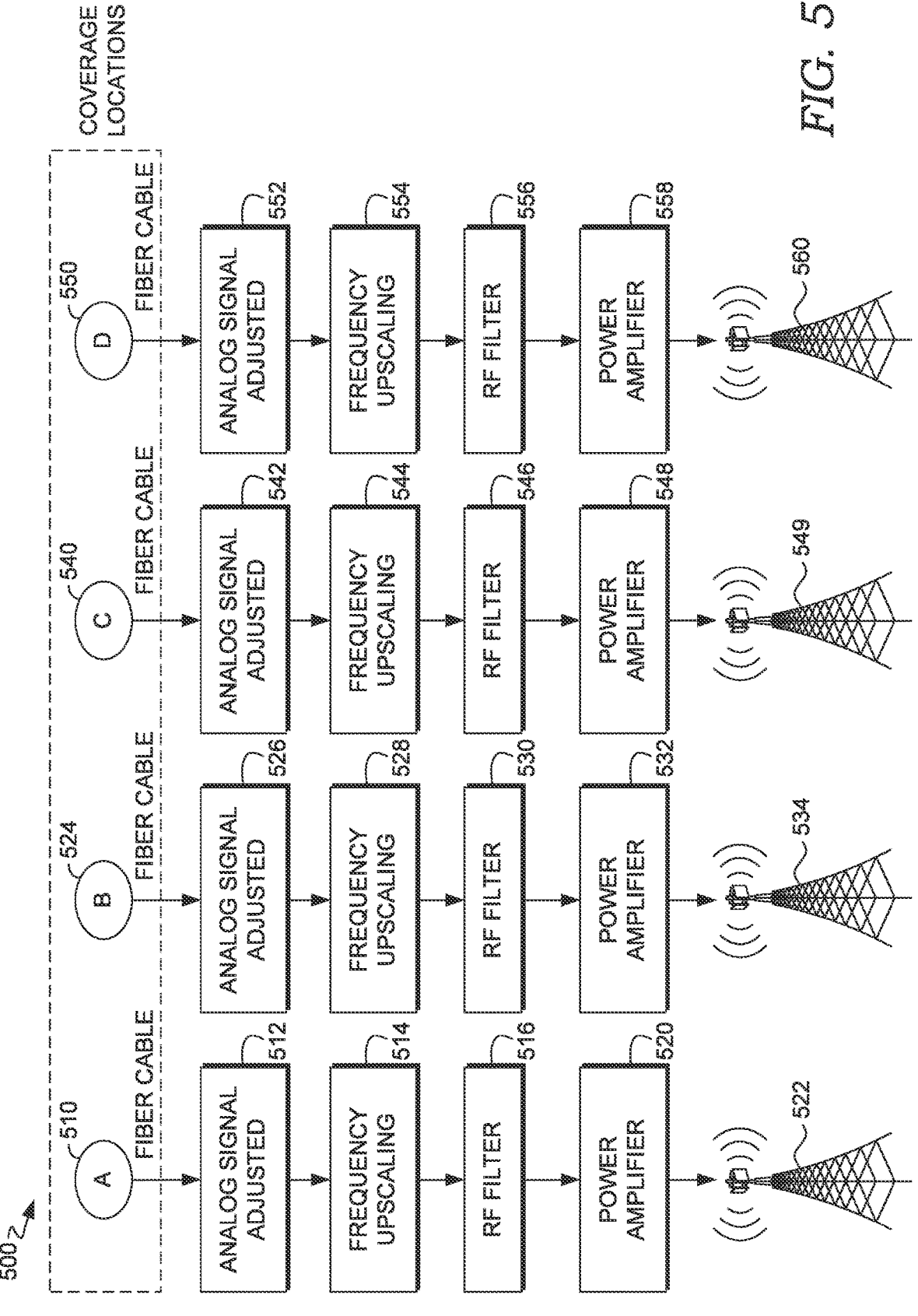
FIG. 5 illustrates another exemplary environment in which the implementations of the present disclosure are implemented to optimize coverage at different locations, in accordance with aspects herein.

FIG. 5 illustrates an exemplary environment in which the implementations of the present disclosure are implemented to optimize coverage at different locations. In FIG. 5, the communication process 500 from each coverage location A-D (510, 534, 540, and 550) is illustrated. Beginning with coverage location A—510, communication signals are transmitted in analog format but the signal is adjusted at 512 as needed. Then frequency upscaling occurs at 514 followed by being filtered by an RF filter 516. The power amplifier 520 then amplifies the power as appropriate and transmits the signals to the base station/base band such as base station 522. Similarly, coverage locations B 524, coverage location C 540 and coverage location D 500 transmit signals via fiber cables to the central location. At the central location, the analog signals are adjusted at 526, 542, and 552 respectively. Appropriate frequency upscaling also occurs on the signals received from coverage locations B 524, C 540 and D 550 at 538, 544, and 554. Further processing by an RF filter occurs for each of the signals from the coverage locations at 530, 546, and 556. Then, the power is amplified by power amplifiers 532, 548, and 558 prior to being transmitted to the appropriate base bands/base stations 534, 549, and 560. The power amplifiers 520, 532, 548, and 558 amplify the lower power of the signal that occurs after frequency upscaling. The base stations/antenna 522, 534, 549, and 560 are passive and create patterns to then transmit the gain.

FIG. 6 depicts a flow diagram of an exemplary method 600 for dynamically optimizing on-demand coverage for coverage locations. Beginning with block 610, a first set of data identifying a number of users needing coverage at a first event location of the plurality of event locations during a first event is received, for example, by the data receiver 314. Then the data is analyzed, by data analyzer 316, along with the capacity determiner 318 that will determine whether the number of users needing coverage at the first event location of the plurality of event locations exceeds a predetermined capacity threshold for the first event location for the first event at block 620.

Following this, based on determining that the number of users needing coverage at the first event location of the plurality of event locations exceeds the predetermined capacity threshold for the first event, the transmitter 320 will transmit a signal or message to the controller 326 directing the controller, via the baseband assignor 328, to assign at least one additional baseband to the first coverage location for the first event at block 630. In some aspects, while not shown in FIG. 6, the method may further include receiving a second set of data by the data receiver 314 that indicates whether the addition of the at least one additional baseband to the first coverage location meets the coverage needs for the number of users at the coverage location during the first event. If it is determined that the that the number of users needing coverage at the first location still exceeds the predetermined capacity threshold for the first event, then additional basebands may be assigned by the baseband assignor 328 to the first coverage location. If it is determined that the additional assignment of basebands by the baseband assignor 328 is sufficient and that the users at the coverage location for the first event have adequate coverage so that the users are able to effectively utilize their wireless devices, then no additional coverage is currently needed. In some other aspects, the data receiver 314 may periodically or on a predetermined schedule receive additional data sets that can be analyzed by analyzer 316 to monitor whether the coverage location is receiving adequate capacity to provide coverage to all the users present during the first event. As the number of users may increase or decrease throughout the first event, the method may further include adjusting the assignment of basebands to the coverage location on-demand and in real-time.

Figure 7:
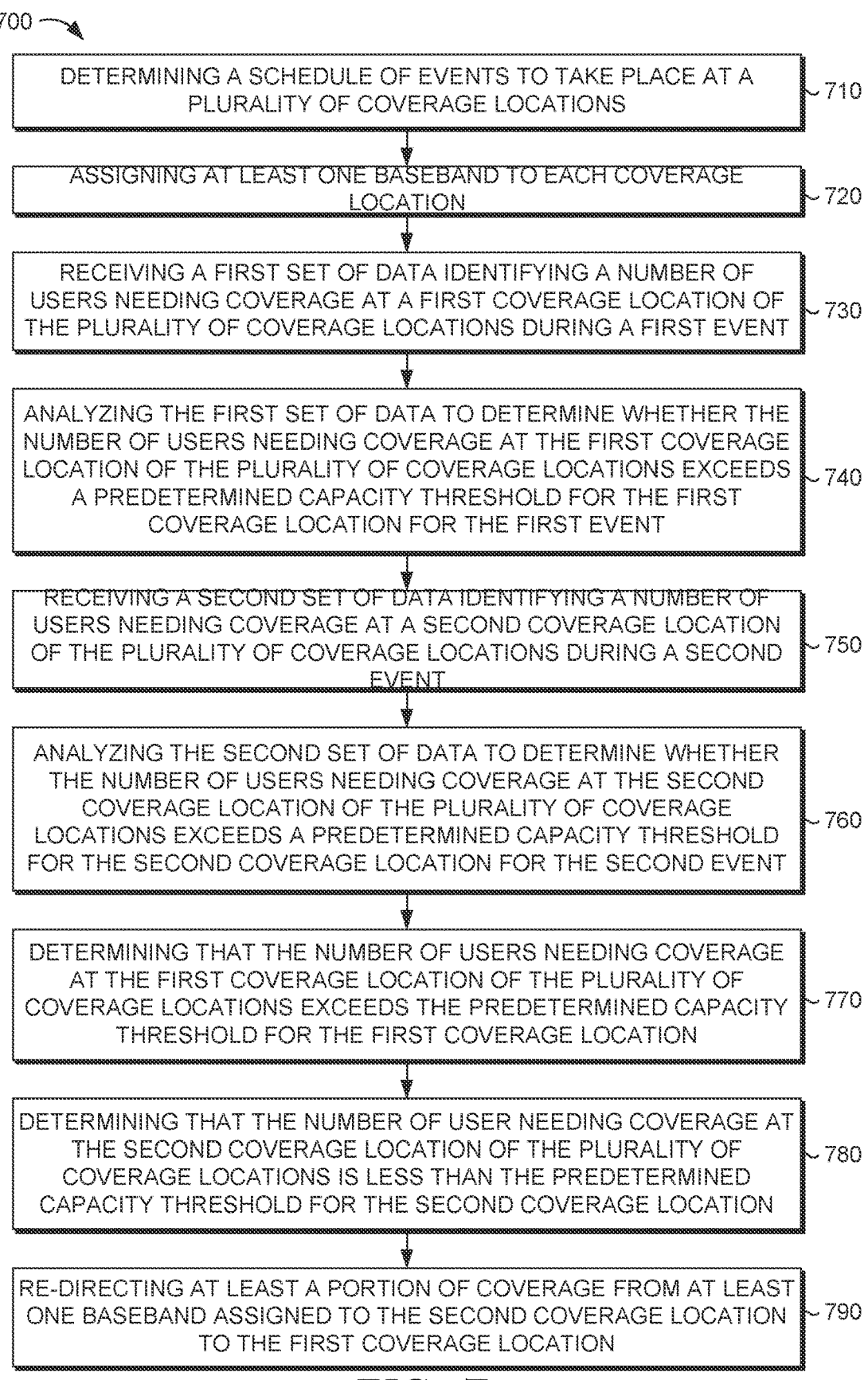
FIG. 7 depicts a flow diagram of another exemplary method for optimizing coverage at different locations, in accordance with aspects herein.

FIG. 7 depicts another flow diagram of an exemplary method 700 for dynamically optimizing on-demand coverage for coverage locations. Beginning at block 710, a schedule of events to take place at a plurality of event locations is determined. In aspects described herein, the scheduler 322 may determine the schedule of events to take place which includes the location of each event, date, time, duration and any other relevant data pertaining to providing coverage for users during each event. Based on the schedule of events, the baseband assignor 328 can then assign at least one baseband to each event location at block 720.

Following this, the data receiver 314 receives a first set of data identifying a number of users needing coverage at a first event location during a first event at block 730. At block 740, the first set of data is analyzed by analyzer 316 to determine whether the number of users needing coverage at the first event location exceeds a predetermined capacity for the first event location for the first event. A second set of data identifying a number of users needing coverage at a second event location during a second event is received at block 750. In aspects, the data analyzer 316 analyzes the second set of data to determine whether the number of users needing coverage at the second event location exceeds a predetermined threshold capacity for the second event location for the second event at block 760. The capacity determiner 318 then determines that the number of users needing coverage at the first event location exceeds the predetermined capacity for the first event location at block 770. Next, at block 780, the capacity determiner 318 also determines that the number of users needing coverage at the second event location is less than the predetermined threshold capacity for the second event location. Subsequently, the transmitter 320 may transmit a signal or message to the controller 326 directing the baseband assignor 328 located at the controller 326 to re-direct or assign at least a portion of coverage from at least one baseband assigned to the second event location to the first event location at block 790.

In aspects, the first event and the second event may occur at the same time or around the same time. Further, in aspects, the method may further include receiving a third set of data indicating whether the additional coverage provided to the first event location meets the capacity needs of the number of users at the first event location for the first event may be received by data receiver 314. In aspects, the additional coverage provided to the first event location is directed back to the second event location at the conclusion of the first event. In yet other aspects, the method may continue with the system periodically requesting additional data from the first event location and second event location to determine whether more or less coverage is needed based on the number of users present at each of the first event location and the second event location.

Having described the system 300 and components thereof, it will be understood by those of ordinary skill in the art that system 300 is but one example of a suitable system and is not intended to limit the scope of use or functionality of the present invention. Similarly, system 300 should not be interpreted as imputing any dependency and/or any requirements with regard to each component and combination(s) of components illustrated in FIGS. 3-5. It will be appreciated by those of ordinary skill in the art that the location of components illustrated in FIGS. 3-5 are an example, as other methods, hardware, software, components, and devices for establishing communication links between the components shown in FIGS. 3-5, may be utilized in implementations of the present invention. It will be understood to those of ordinary skill in the art that the components may be connected in various manners, hardwired or wireless, and may use intermediary components that have been omitted or not included in FIGS. 3-5 for simplicity's sake. As such, the absence of components from FIGS. 3-5 should be not be interpreted as limiting the present invention to exclude additional components and combination(s) of components. Moreover, though components are represented in FIGS. 3-5 as singular components, it will be appreciated that some aspects may include a plurality of devices and/or components such that FIGS. 3-5 should not be considered as limiting the number of a device or component.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for optimizing on-demand coverage at one or more locations, the system comprising:

a plurality of coverage locations;

a centralized location comprising a plurality of basebands and at least one controller;

a plurality of fiber cables extending from the centralized location to the plurality of coverage locations;

one or more processors configured to perform operations comprising:

receiving a first set of data identifying a number of users needing coverage at a first coverage location of the plurality of coverage locations during a first event;

determining whether the number of users needing coverage at the first coverage location of the plurality of coverage locations exceeds a predetermined capacity threshold for the first coverage location for the first event; and based on determining that the number of users needing coverage at the first coverage location of the plurality of coverage locations exceeds the predetermined capacity threshold for the first event, communicating to the controller indicating that additional capacity is needed at the first coverage location for the first event.

2. The system of claim 1, wherein the controller dynamically increases the capacity at the first coverage location by assigning at least one additional baseband to the first coverage location for the first event.

3. The system of claim 1, wherein the system assigns the least one additional baseband to the first coverage location for a predetermined period of time.

4. The system of claim 3, wherein the assignment of at least one additional baseband increases capacity and throughput at the first coverage location.

5. The system of claim 1, wherein each central location further comprises a first converter that converts a digital signal to an analog signal.

6. The system of claim 1, wherein each coverage location further comprises a second converter that converts the analog signal to an RF signal.

7. The system of claim 1, wherein each coverage location further comprises an amplifier and at least one antennae.

8. The system of claim 1, wherein the predetermined capacity threshold for the first coverage location is a maximum number of users that the system can provide coverage for at the first coverage location.

9. The system of claim 1, wherein the system receives a second set of data to determine whether the at least one additional baseband meets coverage needs for the users at the first coverage location.

10. The system of claim 1, wherein the first set of data received includes at least the following: data describing a first event taking place, the number of users at the first coverage location, and duration of the first event.

11. The system of claim 1, wherein the system receives a signal indicating the first event has concluded and based on such indication, re-directs the at least one additional baseband from the first coverage location.

12. A method for optimizing on-demand coverage at one or more coverage locations, the method comprising:

receiving a first set of data identifying a number of users needing coverage at a first coverage location of the plurality of coverage locations during a first event;

determining whether the number of users needing coverage at the first coverage location of the plurality of event locations exceeds a predetermined capacity threshold for the first event location for the first event; and based on determining that the number of users needing coverage at the first coverage location of the plurality of event locations exceeds the predetermined capacity threshold for the first event, direct the controller to assign at least one additional baseband to the first coverage location for the first event.

13. The method of claim 12, further receiving a second set of data indicating whether the addition of the at least one baseband to the first coverage location meets coverage needs for the number of users at the first coverage location.

14. The method of claim 13, further comprising determining that the number of users needing coverage at the first location still exceeds the predetermined capacity threshold for the first event.

15. The method of claim 14, further comprising directing the controller to assign a second additional baseband to the first coverage location.

16. A system for optimizing on-demand coverage at one or more coverage locations, the system comprising:

a plurality of coverage locations;

a centralized location comprising a plurality of basebands and at least one controller;

a plurality of fiber cables extending from the centralized location to a plurality of coverage locations;

one or more processors configured to perform operations comprising:

determining a schedule of events to take place at a plurality of coverage locations;

assigning at least one baseband to each coverage location for each event scheduled;

receiving a first set of data identifying a number of users needing coverage at a first coverage location during a first event;

analyzing the first set of data to determine whether the number of users needing coverage at the first coverage location exceeds a predetermined capacity for the first coverage location for the first event;

receiving a second set of data identifying a number of users needing coverage at a second coverage location during a second event;

analyzing the second set of data to determine whether the number of users needing coverage at the second coverage location exceeds a predetermined capacity for the second coverage location for the second event;

determining that the number of users needing coverage at the first coverage location exceeds the predetermined capacity for the first coverage location;

determining that the number of users needing coverage at the second coverage location is less than the predetermined capacity for the second coverage location; and re-directing at least a portion of coverage from at least one baseband assigned to the second coverage location to the first coverage location.

17. The system of claim 16, wherein the first event and the second event are scheduled at the same time.

18. The system of claim 16, wherein the system further receives a third set of data indicating whether the additional coverage provided to the first coverage location meets the capacity needs of the number of users at the first coverage location for the first event.

19. The system of claim 16, wherein the additional coverage provided to the first coverage location is directed back to the second coverage location at the conclusion of the first event.

20. The system of claim 16, wherein the system requests additional data sets during the first event and second event from the first coverage location and second coverage location to determine whether more or less coverage is needed based on the number of users present at each of the first coverage location and the second coverage location.

\* \* \* \* \*